UNITED STATES PATENT OFFICE.

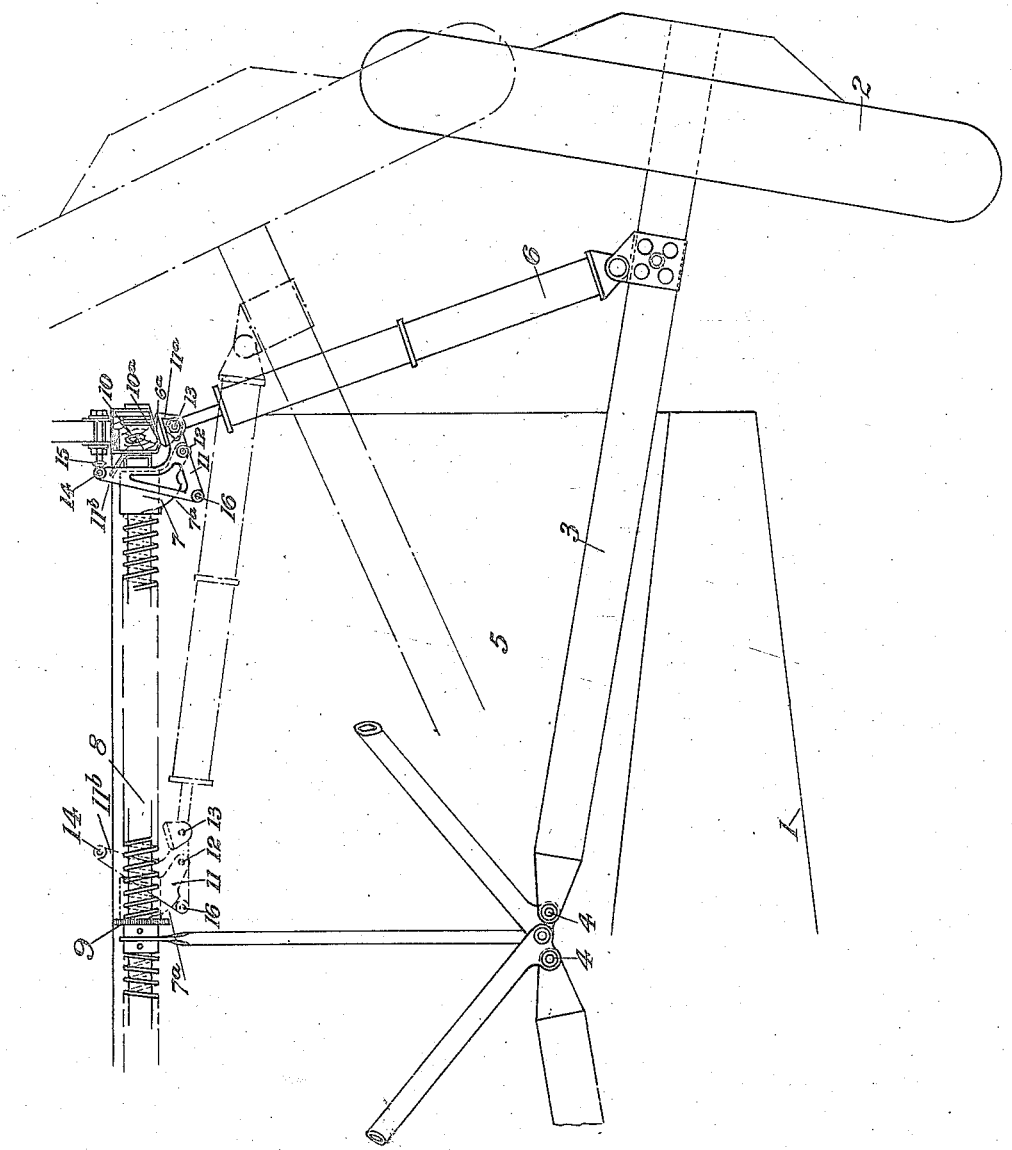

HAROLD BOLAS, OF CLIFTON, BRISTOL, ENGLAND, ASSIGNOR TO GEORGE GEACH PARNALL, OF PARK ROW, BRISTOL, ENGLAND.

ALIGHTING-GEAR OF AIRCRAFT.

1,386,310. Specification of Letters Patent. Patented Aug. 2, 1921.

Application filed January 6, 1921. Serial No. 435,434.

*To all whom it may concern:*

Be it known that I, HAROLD BOLAS, a subject of the King of Great Britain, residing at 7 Windsor Terrace, Clifton, Bristol, England, have invented a new and useful Improvement in and Relating to the Alighting-Gear of Aircraft, for which I have filed application in Great Britain, No. 22514, dated September 12, 1919; and I hereby declare the following to be a full, clear, and exact description of the same.

This invention has reference to improvements in aircraft of the character adapted to be employed as a combined seaplane and aeroplane, such machines being provided with wheels for alighting on the land or on a ship or other solid surface, and with a float or floats for alighting on water.

Machines of the aforesaid character which are termed hydro-aeroplanes have the landing wheels so mounted that while on the one hand they may be used when the machine is leaving or alighting on the ground they will not present any head resistance when the machine is in the air or on the water. The landing wheels are so mounted upon or relative to the float that they can be withdrawn above the level of the bottom of the float or lowered below that level as occasion arises.

The present invention comprises alighting gear for aircraft of a combined seaplane and aeroplane character, wherein the alighting wheels are adjustably disposed relative to the float so that they can be raised above the bottom surface of the float the axles of the alighting wheels being pivotally mounted within the float and connected to shock absorbers, said shock absorbers in turn being pivotally connected to the means for adjusting the position of the wheels, the aforesaid alighting gear embodying novel features of construction as will be hereinafter described.

This invention will now be described in conjunction with the accompanying drawing which represents a half elevation of the chassis of the aircraft and shows the preferred means of carrying the invention into effect. In the drawing the full line position indicates the position of the mechanism when the landing wheels are in their lowest position for alighting on solid surfaces, that is the lower section of the landing wheel is below the bottom of the float, the dotted line position of the mechanism indicates the position assumed by the landing wheels and their connected mechanism when the wheels are raised to their highest position to permit of the aircraft alighting on water.

This invention is illustrated and will now be described as applied to a combined seaplane and aeroplane of the single central float type, the bottom of the float being indicated by the line designated 1. The alighting wheels 2 are disposed on each side of the float and are mounted on separate axles 3 which are hinged at their inner ends on pins 4 fixed within the float. The axles 3 have a guided motion within slots 5 formed in the sides of the float, each side of the slots being formed by bulkheads which divide the float more or less into two separate compartments. Shock absorbers 6 are introduced between the axles 3 and the traversable nuts which will be hereinafter referred to, the said shock absorbers comprising broadly telescopic spring controlled members of substantially known construction which will not require further description.

For the purpose of raising the alighting wheels 2 above the lower surface 1 of the float horizontally traversable nuts 7 are provided which are pivotally connected to the upper ends of the shock absorbers, the nuts 7 being traversed thwartwise along horizontal screws 8 which are oppositely threaded, the screws being rotated through a sprocket wheel 9 which is driven by a chain which is operated by any suitable means from the cabin of the aircraft, and is under the control of the occupants of the machine.

For the purpose of insuring that the thrust received by the alighting wheels 2 is accurately received by the inwale 10 of the float, the lower surface $10^a$ is disposed at or substantially at right angles to the axial center-line of the shock absorber 6, when however it is desired to move the nuts 7 toward the center of the float for the purpose of raising the alighting wheels the difficulty arises of causing the bearing block $6^a$ at the upper end of the shock absorber 6 to clear the inclined lower face $10^a$ of the inwale 10 with which it is in contact. In order to overcome this difficulty side links 11 which substantially form bell crank levers are fulcrumed on the nut 7 by means of the pin 12, the arm $11^a$ of the link 11 is pivotally connected at 13 to the upper end of the shock absorber 6 and the pin 14 which spans across the top ends of the arms 11$^b$ of the links 11 is, when in the outer position as seen in full lines in the drawings, in contact with the face of the adjustable stop 15 which is mounted in the frame of the aircraft. The links 11 are also provided with a cross pin 16 which forms a positioning stop for the links in relation to the nut 7 as will be hereinafter described.

The manner in which the bearing block 6$^a$ pivotally connected to the inner member of the telescopic spring controlled shock absorber 6 is removed from contact with the inclined lower face 10$^a$ of the inwale 10 will now be described. Rotation is imparted to the screw 8 through the chain drive to the sprocket wheel 9, by this rotation of the screw 8 the nut 7 is transversed toward the center of the float. Traversed with the nut are the bell cranked links 11 which are mounted thereon and fulcrumed on the pin 12. This inward movement of the nut 7 and the links 11 draws the bearing block 6$^a$ inwardly and downwardly along the inclined lower face 10$^a$ of the inwale 10, in so doing the spring within the telescopic shock absorber 6 is very slightly compressed owing to the angle of the inclined face 10$^a$ to the horizontal, this traversing of the nut and links results in a downward motion of the arms 11$^a$ of the links 11, the contact between the pin 14 and the head of the stop 15 is maintained until the right hand corner of the block 6$^a$ escapes from the lowest point of the inclined face 10$^a$. From this point owing to the weight of the wheels 2 and the axles 3 and the shock absorber 6 the bell cranked links 11 move to and occupy the dotted line position seen at the left hand side of the drawing and the pin 14 moves away from the head of the stop 15, the remainder of the traverse of the nut 7 and of the links 11 taking place with the parts in the position indicated by the dotted lines. It will be seen that this inward motion of the nut 7 has resulted in the raising of the alighting wheels 2 about their pivot 4 the wheels being gradually raised until they reach the dotted line position indicated in the drawing.

As soon as the block 6$^a$ is removed from contact with the inwale 10 the weight of and dependent from the shock absorber 6 is sufficient to turn the links 11 to the position seen in dotted lines on the left hand side of the figure, the motion of the links being limited in this direction by means of the stop pin 16 which now contacts with the face 7$^a$ of the nut 7. On a return motion being applied to the screw 8 the pin 14 will be brought into contact with the adjustable stop 15 and continued motion of the screw 8 will rock the links 11 about their fulcrum 12 to position and maintain the bearing block 6$^a$ relative to the inwale 10 as seen by the right hand position in the drawing.

By means of this invention the alighting wheels can be positioned below the float or floats in the event of requiring to land the machine on a solid surface, and when it may be desired to alight on or fly off the water the said wheels can be raised above the bottom surface of the float so as not to impede or interfere with the planing action of the machine.

Claims:—

1. Alighting gear for aircraft of a combined seaplane and aeroplane character, comprising in combination a float, two alighting wheels mounted on separate axles, said axles being pivotally mounted within said float, shock absorbing struts pivotally connected to said axle, means mounted on and controlled by a rotatable screw and pivotally connected to the upper end of said struts for simultaneously adjusting the position of the alighting wheels relative to the float.

2. Alighting gear for aircraft of a combined seaplane and aeroplane character, comprising in combination alighting wheels mounted on axles pivotally mounted at their inner ends, shock absorbing struts pivotally connected to said axles, said struts being pivotally connected at their upper end to blocks adapted to normally contact with the inwale of the aircraft, a rotatable screw, a traversable nut mounted thereon, links pivotally mounted on said nut, said links being pivotally connected to said shock absorbing struts and having their motion limited by stops.

In testimony whereof, I have signed my name to this specification.

HAROLD BOLAS.